(12) United States Patent
Hsu et al.

(10) Patent No.: US 11,435,844 B2
(45) Date of Patent: Sep. 6, 2022

(54) ELECTRONIC DEVICE AND FORCE SENSING TOUCH ASSEMBLY THEREOF

(71) Applicant: ASUSTeK COMPUTER INC., Taipei (TW)

(72) Inventors: Ching-Fu Hsu, Taipei (TW); Wei-Ting Wong, Taipei (TW); Chun-Wei Li, Taipei (TW); Hung-Yi Lin, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 16/993,388

(22) Filed: Aug. 14, 2020

(65) Prior Publication Data
US 2021/0064176 A1 Mar. 4, 2021

(30) Foreign Application Priority Data
Aug. 29, 2019 (TW) .................. 108131141

(51) Int. Cl.
*G06F 3/041* (2006.01)
*G06F 3/044* (2006.01)

(52) U.S. Cl.
CPC ............ *G06F 3/0414* (2013.01); *G06F 3/044* (2013.01); *G06F 3/0412* (2013.01); *G06F 2203/04103* (2013.01); *G06F 2203/04105* (2013.01)

(58) Field of Classification Search
CPC . G06F 2203/04103; G06F 2203/04105; G06F 3/0412; G06F 3/0414; G06F 3/044; G06F 3/0445

See application file for complete search history.

(56) References Cited

U.S. PATENT DOCUMENTS

| | | | |
|---|---|---|---|
| 9,310,920 B2 | 4/2016 | Li et al. | |
| 9,459,746 B2 | 10/2016 | Rosenberg et al. | |
| 9,904,393 B2 | 2/2018 | Frey et al. | |
| 2011/0227836 A1* | 9/2011 | Li | G01L 1/205 345/173 |
| 2012/0013573 A1 | 1/2012 | Liu et al. | |
| 2013/0015907 A1* | 1/2013 | Li | G06F 3/0416 327/517 |
| 2014/0218334 A1* | 8/2014 | Shibata | G06F 3/04166 345/174 |

(Continued)

FOREIGN PATENT DOCUMENTS

| | | |
|---|---|---|
| CN | 101833387 A | 9/2010 |
| CN | 103069365 A | 4/2013 |

(Continued)

*Primary Examiner* — Hong Zhou
(74) *Attorney, Agent, or Firm* — McClure, Qualey & Rodack, LLP

(57) ABSTRACT

An electronic device and its force touch assembly are provided. The force touch assembly includes a first substrate, a second substrate, a first patterned conductive layer, an insulation layer, a second patterned conductive layer, a plurality of variable pressure sensitive materials and a third patterned conductive layer, wherein the first patterned conductive layer, the insulation layer, the second patterned conductive layer, the plurality of variable pressure sensitive materials and the third patterned conductive layer are sequentially stacked from top to bottom between the first substrate and the second substrate.

8 Claims, 9 Drawing Sheets

(56) References Cited

U.S. PATENT DOCUMENTS

| | | | | |
|---|---|---|---|---|
| 2015/0084909 | A1* | 3/2015 | Worfolk | G06F 3/0445 |
| | | | | 345/174 |
| 2016/0231849 | A1* | 8/2016 | Watazu | G06F 3/0445 |
| 2016/0282999 | A1* | 9/2016 | Hwang | G06F 3/0446 |
| 2017/0220162 | A1* | 8/2017 | Ko | G06F 3/0445 |
| 2017/0242541 | A1* | 8/2017 | Iuchi | G06F 3/04182 |
| 2018/0120983 | A1* | 5/2018 | Oh | G02F 1/13338 |
| 2019/0179470 | A1 | 6/2019 | Hang et al. | |

FOREIGN PATENT DOCUMENTS

| | | |
|---|---|---|
| CN | 103221906 A | 7/2013 |
| CN | 203502944 U | 3/2014 |
| CN | 105607790 B | 5/2016 |
| CN | 105934733 A | 9/2016 |
| CN | 106855756 A | 6/2017 |
| CN | 107562242 A | 1/2018 |
| CN | 109740414 A | 5/2019 |
| CN | 110058715 A | 7/2019 |

\* cited by examiner

ELECTRONIC DEVICE AND FORCE SENSING TOUCH ASSEMBLY THEREOF

CROSS-REFERENCE TO RELATED APPLICATION

This application claims the priority benefit of Taiwan applications serial No. 108131141, filed on Aug. 29, 2019. The entirety of the above-mentioned patent application is hereby incorporated by reference herein and made a part of specification.

BACKGROUND OF THE INVENTION

Field of the Invention

The invention relates to an electronic device and a force touch assembly thereof.

Description of the Related Art

Currently, there are various architectures of a force touch assembly for implementing the pressure-sensitive touch function. Some force touch assemblies adopt cantilever mechanism combined with strain gauges for pressure sensing purposes. Some force touch assemblies have a pressure sensing film between a display and a backlight module to achieve the purpose of sensing pressure (force) information through changes in capacitance. However, the aforementioned architectures have the following disadvantages. For example, the complexity of the mechanism design is increased. The requirements for assembly alignment are higher. When the alignment is not accurate, it will affect the accuracy of each sensing position during pressure sensing, and will also affect the accuracy and stability of the pressure value calculation.

BRIEF SUMMARY OF THE INVENTION

According to the first aspect, a force touch assembly is provided. The force touch assembly includes: a first substrate, a second substrate, a first patterned conductive layer, an insulation layer, a second patterned conductive layer, a plurality of variable pressure sensitive materials and a third patterned conductive layer, wherein the first patterned conductive layer, the insulation layer, the second patterned conductive layer, the plurality of variable pressure sensitive materials and the third patterned conductive layer are sequentially stacked from top to bottom between the first substrate and the second substrate.

According to the second aspect, an electronic device is provided. The electronic device includes: a force touch assembly and a processor. The force touch assembly includes a first substrate, a second substrate, a first patterned conductive layer, an insulation layer, a second patterned conductive layer, a plurality of variable pressure sensitive materials and a third patterned conductive layer, wherein the first patterned conductive layer, the insulation layer, the second patterned conductive layer, the plurality of variable pressure sensitive materials and the third patterned conductive layer are sequentially stacked from top to bottom between the first substrate and the second substrate. The first patterned conductive layer includes a plurality of capacitive sensing electrodes, the second patterned conductive layer includes a plurality of common electrodes, the vertical projection of the common electrodes on the second substrate is interleaved with the vertical projection of the capacitive sensing electrodes on the second substrate, and the third patterned conductive layer includes a plurality of pressure sensing electrodes, the vertical projection of the pressure sensing electrodes on the second substrate is interleaved with the vertical projection of the common electrodes on the second substrate. The processor is electrically connected to the force touch assembly. Each of the capacitive sensing electrodes separately transmits a touch sensing signal to the processor, each of the pressure sensing electrodes separately transmits a pressure sensing signal to the processor, the processor determines the location of a touch behavior according to the touch sensing signal transmitted by each of the capacitive sensing electrodes, and the processor determines the pressure level of the touch behavior according to the pressure sensing signal transmitted by each of the pressure sensing electrodes.

According to the third aspect, an electronic device is provided. The electronic device includes: a force touch assembly and a processor. The force touch assembly includes a first substrate, a second substrate, a first patterned conductive layer, an insulation layer, a second patterned conductive layer, a plurality of variable pressure sensitive materials and a third patterned conductive layer, wherein the first patterned conductive layer, the insulation layer, the second patterned conductive layer, the plurality of variable pressure sensitive materials and the third patterned conductive layer are sequentially stacked from top to bottom between the first substrate and the second substrate. The first patterned conductive layer includes a plurality of capacitive sensing electrodes, the second patterned conductive layer includes a plurality of common electrodes, the vertical projection of the common electrodes on the second substrate is interleaved with the vertical projection of the capacitive sensing electrodes on the second substrate, and the third patterned conductive layer includes a plurality of pressure sensing electrodes, the vertical projection of the pressure sensing electrodes on the second substrate is interleaved with the vertical projection of the common electrodes on the second substrate. The processor is electrically connected to the force touch assembly. Each of the capacitive sensing electrodes separately transmits a touch sensing signal to the processor, each of the common electrodes separately transmits a first voltage division value to the processor, and each of the pressure sensing electrodes separately transmits a second voltage division value to the processor, the processor determines the location of a touch behavior according to the touch sensing signal transmitted by each of the capacitive sensing electrodes, and the processor determines the pressure level of the touch behavior according to the first voltage division value transmitted by each of the common electrodes and the second voltage division value transmitted by each of the pressure sensing electrodes.

Based on the above, a three-dimensional touch detection of the force touch assembly and its driving device are provided. The structural design of the force touch assembly can avoid the assembly misalignment problem. Moreover, the force touch assembly include both a capacitor and a piezoresistive structure design. Therefore, the capacitor structure design is configured to acquire the two-dimensional coordinates and the piezoresistive structure design is configured to sense pressure, thereby providing diversified applications.

These and other features, aspects and advantages of the present invention will become better understood with regard to the following description, appended claims, and accompanying drawings.

DETAILED DESCRIPTION OF THE EMBODIMENTS

Figure 1:
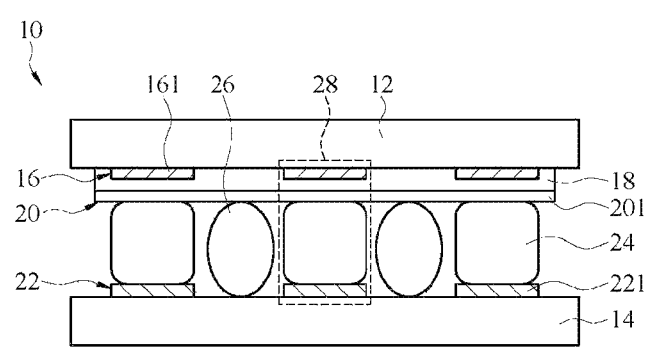
FIG. 1 is a schematic structural view of a force touch assembly of an embodiment.

FIG. 1 is a schematic structural view of a force touch assembly of an embodiment. Please refer to FIG. 1, the force touch assembly 10 includes a first substrate 12, a second substrate 14 disposed opposite to the first substrate 12, a first patterned conductive layer 16, an insulation layer 18, a second patterned conductive layer 20, a plurality of variable pressure sensitive materials 24 and a third patterned conductive layer 22. In an embodiment, the first patterned conductive layer 16, the insulation layer 18, the second patterned conductive layer 20, the plurality of variable pressure sensitive materials 24 and the third patterned conductive layer 22 are sequentially stacked from top to bottom between the first substrate 12 and the second substrate 14. In detail, the first patterned conductive layer 16 is located on the lower surface of the first substrate 12 close to the second substrate 14. The insulation layer 18 is located on a surface of the first patterned conductive layer 16 near the second substrate 14 and covers the first patterned conductive layer 16. The second patterned conductive layer 20 is located on a surface of the insulation layer 18 near the second substrate 14 and the vertical projection of the second patterned conductive layer 20 on the second substrate 14 is interleaved with the vertical projection of the first patterned conductive layer 16 on the second substrate 14. The third patterned conductive layer 22 is located on the upper surface of the second substrate 14 close to the first substrate 12, and the vertical projection of the third patterned conductive layer 22 on the second substrate 14 is interleaved with the vertical projection of the second patterned conductive layer 20 on the second substrate 14. The variable pressure sensitive materials 24 are connected between the second patterned conductive layer 20 and the third patterned conductive layer 22. The force touch assembly 10 also includes a plurality of the spacers 26. The spacers 26 are between the second substrate 14 and the second patterned conductive layer 20 and also between the variable pressure sensitive materials 24 to support the first substrate 12 and the second substrate 14.

In one embodiment, the first patterned conductive layer 16 includes a plurality of capacitive sensing electrodes 161 arranged along a first direction to generate touch sensing signals. The second patterned conductive layer 20 includes a plurality of common electrodes 201 arranged along a second direction for receiving the scanning signal. The vertical projection of the common electrodes 201 on the second substrate 14 is interleaved with the vertical projection of the capacitive sensing electrodes 161 on the second substrate 14. The third patterned conductive layer 22 includes a plurality of pressure sensing electrodes 221 arranged along the first direction for receiving a pressure sensing signal. The vertical projection of the pressure sensing electrodes 221 on the second substrate 14 is interleaved with the vertical projection of the common electrodes 201 on the second substrate 14. In one embodiment, the first direction is perpendicular to the second direction. In the embodiment, the first direction is the Y-axis direction and the second direction is the X-axis direction, and therefore, the interlaced overlapping position of each of the capacitive sensing electrodes 161 and each of the common electrodes 201 corresponds to the interlaced overlapping position of each of the common electrodes 201 and each of the pressure sensing electrodes 221 and the variable pressure sensitive materials 24. One of the capacitive sensing electrodes 161, one of the common electrodes 201, one of the variable pressure sensitive materials 24 and one of the pressure sensing electrodes 221, which are corresponding to each other, form a sensing unit 28 together. In one embodiment, the number of the capacitive sensing electrodes 161 is the same as that of the common electrodes 201 and that of the pressure sensing electrodes 221 respectively.

In one embodiment, the variable pressure sensitive materials 24 are an elastomer with conductive particles distributed therein. When the force touch assembly 10 is not pressed, there are gap between the conductive particles, and the impedance is large. When the force touch assembly 10 is pressed, the upper and lower adjacent conductive particles contact each other and conduct electricity due to vertical stress, which improves the conductivity and decreases the impedance so as to sense pressure.

Figure 2A:
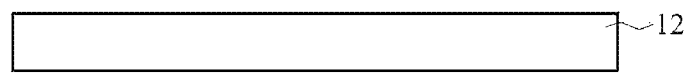
FIG. 2A to FIG. 2I are schematic structural diagrams of each step of producing the force touch assembly of an embodiment.

FIG. 2A to FIG. 2I are schematic structural diagrams of each step of producing the force touch assembly of an embodiment. As shown in FIG. 2A, obtain and clean a first substrate 12. In one embodiment, the material of the first substrate 12 is, but not limited to, glass or plastic, and is a transparent or opaque structural design.

Figure 2B:
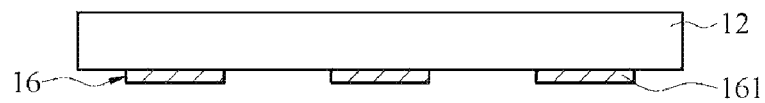

As shown in FIG. 2B, perform a yellow light process of a conductive material on a surface of the first substrate 12, in which the steps of deposition, exposure, lithography, and etching are sequentially performed on the surface of the first substrate 12, to form the first patterned conductive layer 16 (including a plurality of the capacitive sensing electrodes 161 along the first direction) on the first substrate 12. In one embodiment, the material of the first patterned conductive layer 16 is, but not limited to, indium tin oxide (ITO), indium zinc oxide (IZO), or metal.

Figure 2C:

As shown in FIG. 2C, a layer of insulating material is plated on the surface of the first patterned conductive layer 16 to form an insulation layer 18, for protecting the first patterned conductive layer 16, and the insulation layer 18 serves as a capacitive coupling dielectric Floor. In one embodiment, the material of the insulation layer 18 is, but not limited to, silicon dioxide (SiO2) or silicon nitride (SNx).

Figure 2D:
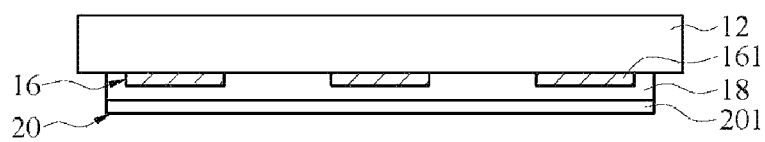

As shown in FIG. 2D, perform a yellow light process of a conductive material on a surface of the insulation layer 18 of the first substrate 12, in which the steps of deposition, exposure, lithography, and etching are sequentially performed on the surface of the insulation layer 18, to form the second patterned conductive layer 20 (including a plurality of the common electrodes 201 along the second direction) on the insulation layer 18. In one embodiment, the material of the second patterned conductive layer 20 is, but not limited to, indium tin oxide (ITO), indium zinc oxide (IZO), or metal.

Figure 2E:
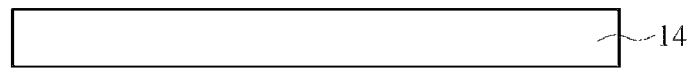

As shown in FIG. 2E, obtain and clean a second substrate 14. In an embodiment, the second substrate 14 is made of hard material. In one embodiment, the material of the second substrate 14 is, but not limited to, glass or plastic, and is a transparent or opaque structure design.

Figure 2F:
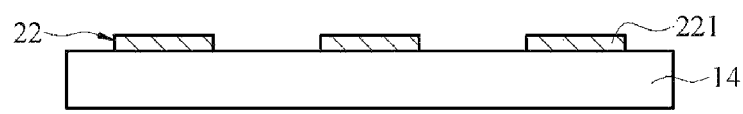

As shown in FIG. 2F, perform a yellow light process of a conductive material on an upper surface of the second substrate 14, in which the steps of deposition, exposure, lithography, and etching are sequentially performed on the upper surface of the second substrate 14, to form the third patterned conductive layer 2 on the second substrate 14 (including a plurality of the pressure sensing electrodes 221 arranged along the first direction). In one embodiment, the material of the third patterned conductive layer 22 is, but not limited to, indium tin oxide (ITO), indium zinc oxide (IZO), or metal.

Figure 2G:
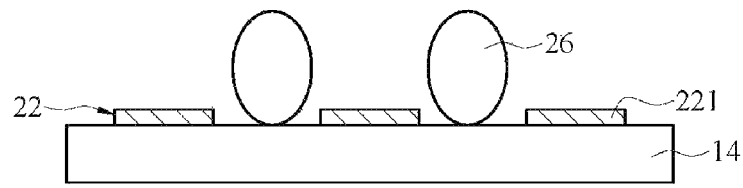

As shown in FIG. 2G, perform a spacer spraying process on a surface of the second substrate 14 with the third patterned conductive layer 22, to form a plurality of the spacers 26 on the second substrate 14. In an embodiment, the spacers 26 is for avoiding collapse problem when the first substrate 12 and the second substrate 14 are assembled. In one embodiment, the material of the spacers 26 is, but not limited to, acrylic transparent insulating glue, silicon dioxide (SiO2), or silicon nitride (SNx).

Figure 2H:
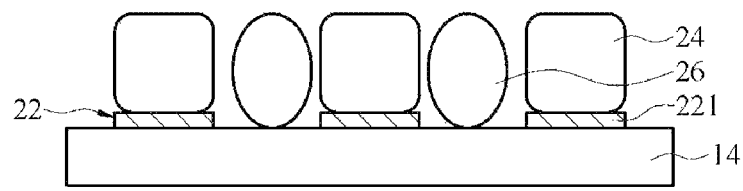

As shown in FIG. 2H, coat a sealing wall (not shown) on the second substrate 14 and cure it by ultraviolet light. In an embodiment, the sealing wall prevents the liquid pressure sensitive material from overflowing into the non-actuation area. In the step, the liquid pressure sensitive material is dropped on the surface of the third patterned conductive layer 22 on the second substrate 14 by a drop-filling method to form a plurality of the variable pressure sensitive materials 24.

Figure 2I:
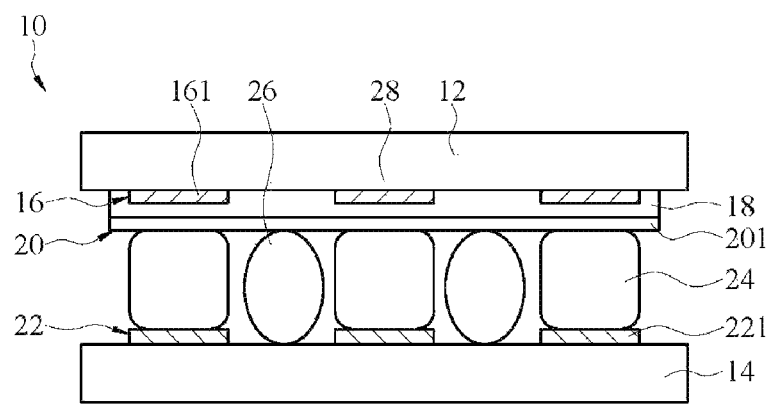

As shown in FIG. 2I, align and assemble the first substrate 12 and the second substrate 14. The first substrate 12 and the second substrate 14 are combined by a photosensitive coupling element (CCD) to form a complete force touch assembly 10.

Figure 3:
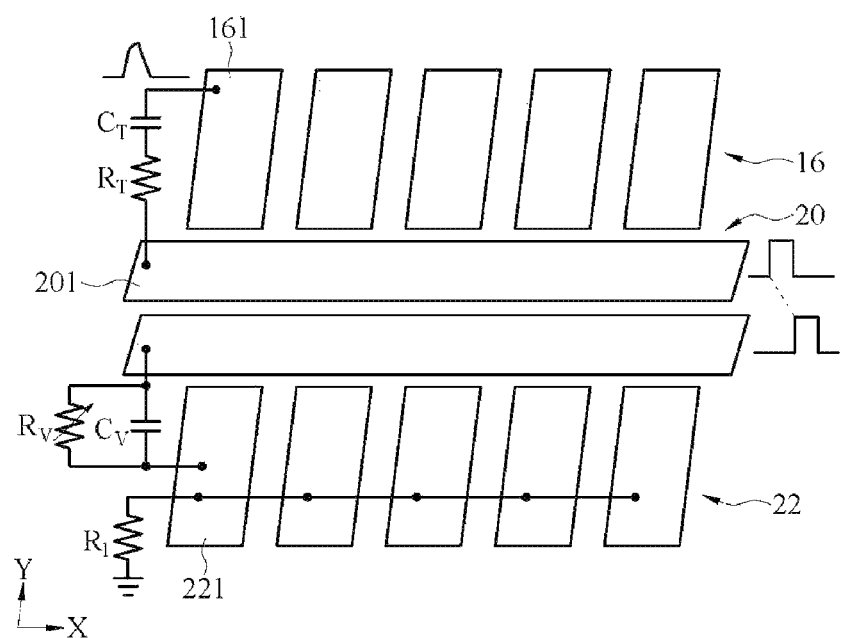
FIG. 3 is a schematic diagram of a driving architecture of the force touch assembly of an embodiment.
Figure 4:
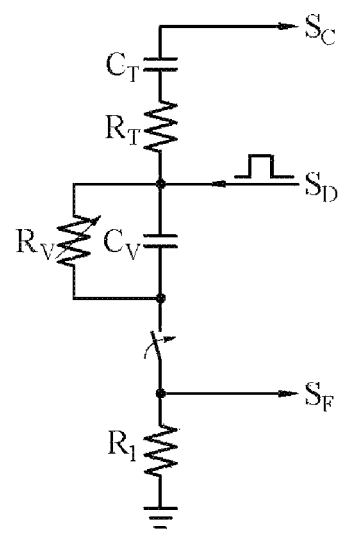
FIG. 4 is a schematic diagram of an equivalent circuit model of a sensing unit of the force touch assembly of an embodiment.

FIG. 3 is a schematic diagram of a driving architecture of the force touch assembly of an embodiment. FIG. 4 is a schematic diagram of an equivalent circuit model of a sensing unit of the force touch assembly of an embodiment. Please also refer to FIG. 1, FIG. 3 and FIG. 4. A first parasitic resistance RT and a first parasitic capacitance $C_T$ are formed between the capacitive sensing electrodes 161 and the common electrodes 201. When the scanning signal $S_D$ is input to the common electrodes 201, the first parasitic capacitance $C_T$ is charged or discharged. When a finger or a conductive object touches the surface of the force touch assembly 10 (when the touch behavior occurs), the original charge-discharge state of the first parasitic capacitance $C_T$ is changed, which causes the touch sensing signal $S_C$ received by the capacitive sensing electrodes 161 to change, and then the occurrence position of the touch behavior is determined according to the touch sensing signal $S_C$. A resistance capacitance (RC) model with a parasitic variable resistance $R_V$ and a second parasitic capacitance $C_v$ is formed between the common electrodes 201 and the pressure sensing electrodes 221 due to use the variable pressure sensitive materials 24. The variable resistance $R_V$ is related to the variable pressure sensitive materials 24, and varies with the pressure on the surface of the force touch assembly 10. When a finger or a conductive object apply a pressure on the upper surface of the first substrate 12 of the force touch assembly 10, the impedance of the variable pressure sensitive materials 24 changes due to compression deformation. The corresponding voltage change is obtained through the impedance change to generate a pressure sensing signal SF, to determine the touch behavior.

In each of the sensing unit 28, the first parasitic resistance RT and the first parasitic capacitance $C_T$ exist between the capacitive sensing electrodes 161 and the common electrodes 201, and the variable resistance $R_V$ and the second parasitic capacitance $C_V$ exist between the common electrodes 201 and the pressure sensing electrodes 221. Since the dielectric constant of the variable pressure sensitive materials 24 is extremely low, the value of the second parasitic capacitance $C_V$ is also very small. When the value of the second parasitic capacitance $C_V$ is very small, the impedance of the second parasitic capacitance $C_V$ becomes very large, which is regarded as an open circuit at this time, so only the variable resistance $R_V$ is considered in this circuit model.

Figure 5:
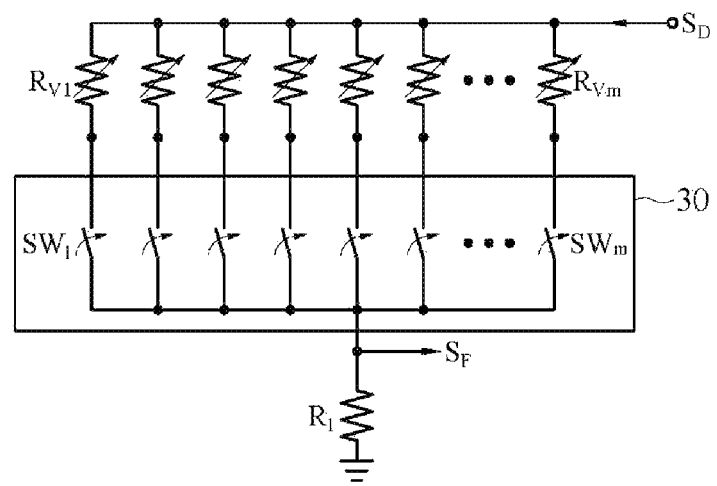
FIG. 5 is a schematic circuit diagram using a multiplexer of an embodiment.

Furthermore, in order to retrieve the deformation information of the variable pressure sensitive materials 24, each of the pressure sensing electrodes 221 are connected to a resistor $R_1$. In an embodiment, the pressure sensing electrodes 221 are separately connected to resistors $R_1$ or commonly connected to one resistor $R_1$. In the embodiment, the pressure sensing electrodes 221 are commonly connected to the resistor $R_1$. As shown in FIG. 5, a multiplexer 30 is connected between the pressure sensing electrodes 221 and the resistor $R_1$. Each of switches $SW_1$ to $SW_m$ of the multiplexer 30 is separately corresponding to variable resistances $R_{V1}$ to $R_{Vm}$, and the multiplexer 30 turns on the corresponding switches $SW_1$ to $SW_m$ according to the scanning signal $S_D$ received by the common electrodes 201, to selectively turn on the connections between one of the pressure sensing electrodes 221 and the resistor $R_1$, which connects the one of the variable resistances $R_V$ (hereinafter $R_V$ is used as the representative of $R_{V1}$ to $R_{Vm}$) and the resistor $R_1$ in series to calculate the voltage division through the variable resistance $R_V$ and the resistor $R_1$ with a fixed resistance value. When the variable resistance $R_V$ impedance changes (that is, when the variable pressure sensitive materials 24 are deformed), the overall impedance is affected to change, causing the voltage division values to change. Therefore the pressure behavior of the touch behavior is determined through the voltage change of the voltage division values ((that is, the pressure sensing signal SF).

Figure 6:
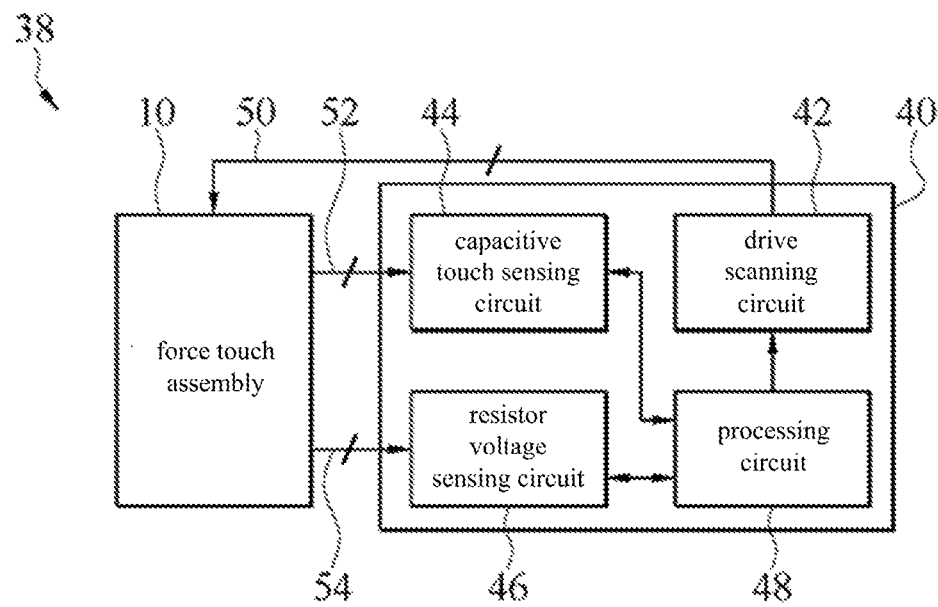
FIG. 6 is a schematic block diagram of an electronic device of an embodiment.
Figures 7, 8:
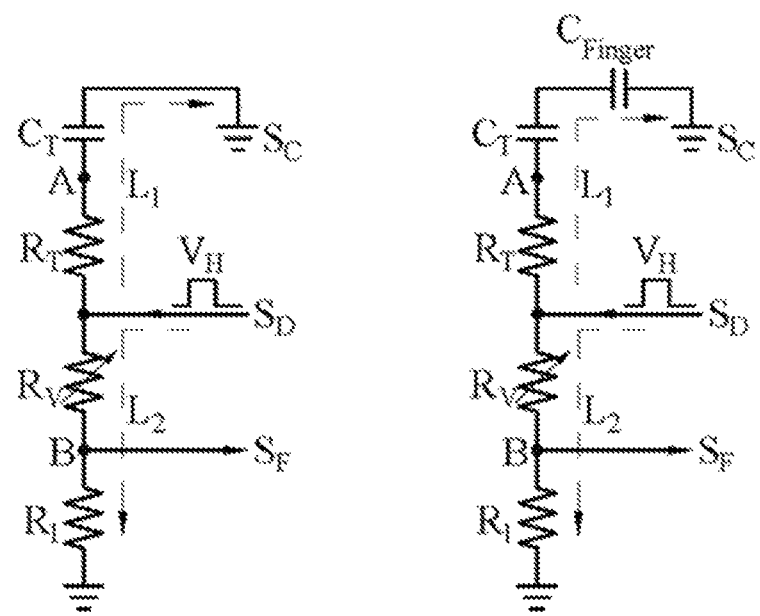
FIG. 7 is an equivalent circuit schematic diagram where the force touch assembly without a touch behavior occurs of an embodiment.
FIG. 8 is an equivalent circuit schematic diagram where the force touch assembly has a touch behavior of an embodiment.

FIG. 6 is a schematic block diagram of an electronic device of an embodiment. FIG. 7 is an equivalent circuit schematic diagram where the force touch assembly without a touch behavior occurs of an embodiment. Please also refer to FIG. 1, FIG. 3, FIG. 6, and FIG. 7, an electronic device 38 includes a processor 40 and a force touch assembly 10, and the processor 40 and the force touch assembly 10 are electrically connected with each other. In an embodiment, the processor 40 drives and senses the force touch assembly 10. In one embodiment, the electronic device 38 is a notebook computer or a tablet computer. The processor 40 includes a drive scanning circuit 42, a capacitive touch sensing circuit 44, a resistor voltage sensing circuit 46 and a processing circuit 48. The drive scanning circuit 42 is electrically connected to the common electrodes 201 through a plurality of the drive scanning lines 50, to sequentially transmit a scanning signal $S_D$ to the corresponding common electrodes 201 through the drive scanning lines 50. The capacitive touch sensing circuit 44 is electrically connected to the capacitive sensing electrodes 161 by a plurality of the capacitive sensing lines 52. The resistor voltage sensing circuit 46 is electrically connected to the pressure sensing electrodes 221 by a plurality of pressure-sensitive measuring lines 54. Each of the capacitive sensing electrodes 161 and each of the corresponding common electrodes 201, which are corresponding to each other, form a capacitive touch sensing loop $L_1$ together, for detecting the touch sensing signals $S_C$. Each of the capacitive sensing electrodes 161 transmits the touch sensing signals $S_C$ to the processor 40 through the capacitive sensing lines 52, and then the processor 40 determines the location of the touch behavior according to the touch sensing signals $S_C$ generated by the capacitive sensing electrodes 161. Similarly, when the common electrodes 201 sequentially receive the scanning signal $S_D$, each of the common electrodes 201, each of the variable pressure sensitive materials 24, each of the pressure sensing electrodes 221 and the resistor R1, which are corresponding to each other, form a varistor sensing loop L2 together, for detecting the pressure sensing signal SF. Each of the pressure sensing electrodes 221 transmits the pressure sensing signal SF to the processor 40 through the pressure-sensitive measuring lines 54, and then the processor 40 determines the pressure level of the touch behavior according to the pressure sensing signals SF. In other words, when the scanning signal $S_D$ generated by the drive scanning circuit 42 is transmitted to the common electrodes 201, the capacitive touch sensing loop $L_1$ is formed by the first parasitic resistance RT and the first parasitic capacitance $C_T$ and the varistor sensing loop $L_2$ is formed by the variable resistance $R_V$ and the resistor $R_1$.

In detail, the processing circuit 48 is electrically connected to the drive scanning circuit 42, the capacitive touch sensing circuit 44 and the resistor voltage sensing circuit 46. When the scanning signal $S_D$ is sequentially transmitted to the common electrodes 201, the capacitive touch sensing loop L1 and the varistor sensing loop L2 of the force touch assembly 10 simultaneously perform signal detection, transmit the touch sensing signal $S_C$ detected by the capacitive touch sensing loop $L_1$ to the capacitive touch sensing circuit 44 and transmit the pressure sensing signal SF detected by the varistor sensing loop $L_2$ to the resistor voltage sensing circuit 46. Then, the capacitive touch sensing circuit 44 converts the touch sensing signals $S_C$ to coordinate information signals (in the embodiment, the coordinate information signals are digital signals), and transmit the coordinate information signals to the processing circuit 48. The resistor voltage sensing circuit 46 converts to the pressure sensing signal SF to pressure information signals (in the embodiment, the pressure information signals are digital signals) and transmits the pressure information signals to the processing circuit 48. When receiving the coordinate information signals and the pressure information signal, the processing circuit 48 determines the location (such as capacitive touch coordinate points) of the touch behavior according to the coordinate information signals, and determines the pressure level of the touch behavior according to the pressure information signals (in an embodiment, perform a pressure sensitive Z-axis information comparison analysis according to the pressure information signals to determine the pressure level of the touch behavior).

In an embodiment, at least two of the drive scanning circuit 42, the capacitive touch sensing circuit 44, the resistor voltage sensing circuit 46 or the processing circuit 48 are integrated in a same integrated circuit (IC). In another embodiment, the drive scanning circuit 42, the capacitive touch sensing circuit 44, the resistor voltage sensing circuit 46 and the processing circuit 48 are independent ICs.

In one embodiment, the processing circuit 48 is implemented by a system on chip (SoC), a microcontroller (MCU), a central the processor (CPU), or a special application the integrated circuit (ASIC), etc.

Please also refer to FIG. 1, FIG. 6, FIG. 7, and FIG. 8, the capacitive touch sensing loop L1 is regarded as an RC charging and discharging circuit. When a finger or a conductive object applies a pressure on the force touch assembly 10, a finger capacitance $C_{Finger}$ is generated to change the total capacitance value in the capacitive touch sensing loop L1, and further change a first voltage of the first node A (that is, the touch sensing signal $S_C$). The capacitive touch sensing circuit 44 converts the first voltage to a coordinate information signal and transmits the coordinate information signal to the processing circuit 48, and then the processing circuit 48 determines the location of the touch behavior according to the change of the coordinate information signal. Meanwhile, the varistor sensing loop $L_2$ is regarded as a basic voltage dividing circuit. When the variable pressure sensitive materials 24 is changed by a pressure (an external force), the variable resistance $R_V$ changes. When the pressure level becomes larger, the resistance value of the variable resistance $R_V$ becomes smaller, and when the pressure channel becomes smaller, the resistance value of the variable resistance $R_V$ becomes larger. In this way, a voltage division processing is performed by the variable resistance $R_V$ with the variable value and the external resistor $R_1$, to generate a second voltage (that is, the pressure sensing signal SF) of a second node B. Then, the resistor voltage sensing circuit 46 converts the second voltage into the pressure information signal and transmits the pressure information signal to the processing circuit 48, and the processing circuit 48 determines the pressure level of the touch behavior according to the change of the pressure information signal.

In an embodiment, the resistor $R_1$ is 1 kΩ the first parasitic resistance RT is 30 kΩ the first parasitic capacitance $C_T$ is 100 pF, and the scanning signal $S_D$ of the input voltage $V_H$ is 5V. When the force touch assembly 10 is not pressed, it means that no fingers or conductive objects are pressed on the surface of the force touch assembly 10. At this time, the variable resistance $R_V$ is 10 kΩ. The processing circuit 48 calculates that the second voltage of the second node B is equal to 5*(1/(1+10))=0.45V based on the input voltage $V_H$ is 5V, the resistor R1 is 1 kΩ and the variable resistance $R_V$ is 10 kΩ. When the force touch assembly 10 is pressed, it means that the finger or the conductive object is pressed on the surface of the force touch assembly 10, the finger capacitance $C_{Finger}$=5 pF is generated, and the variable resistance $R_V$ is changed to 5 kΩ the processing circuit 48 calculates that the second voltage of the second node B is equal to 5*(1/(1+5))=0.83V based on the input voltage $V_H$ is 5V, the resistor $R_1$ is 1 kΩ, and the variable resistance $R_V$ is 5 kΩ.

Figure 9:
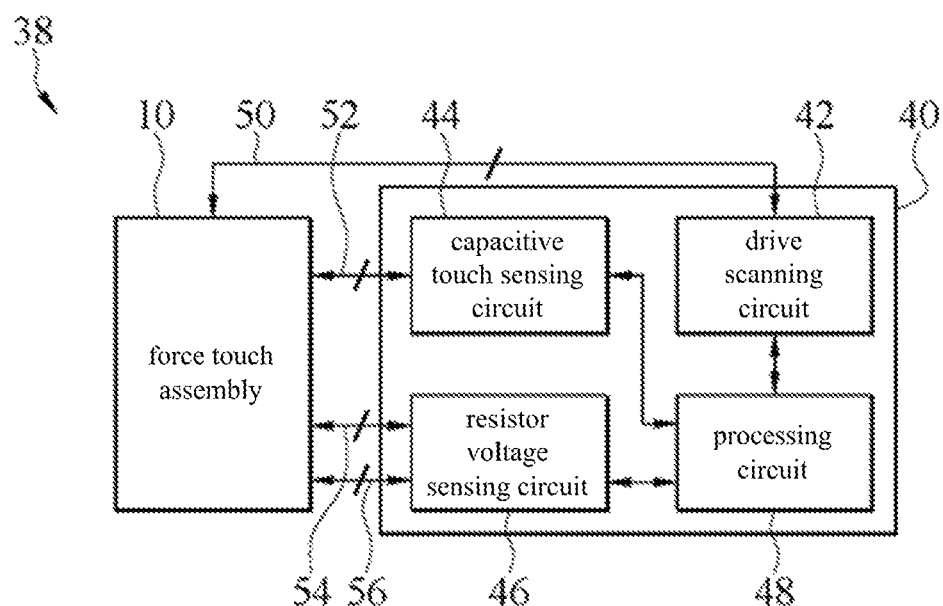
FIG. 9 is a schematic diagram of a circuit block of an electronic device of another embodiment.
Figure 10:
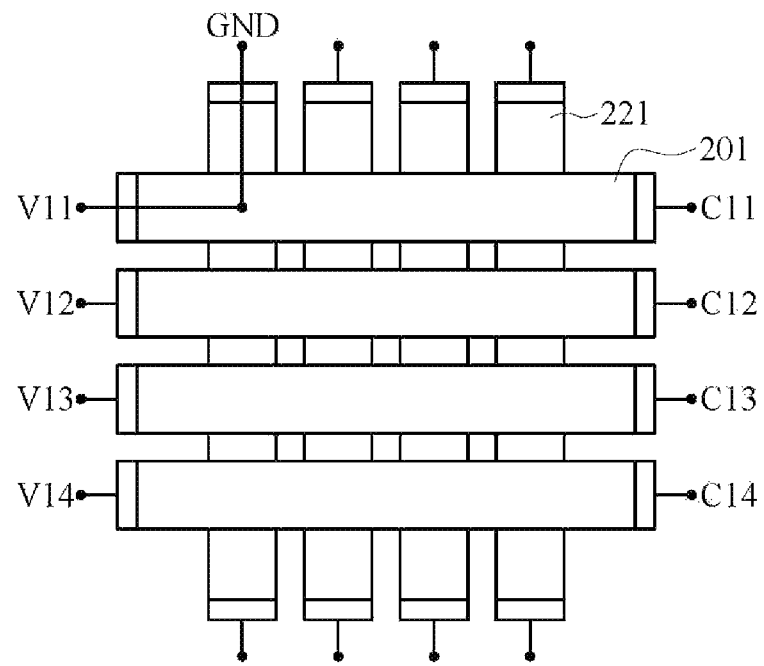
FIG. 10 is a schematic diagram of a first driving structure of common electrode s and pressure sensing electrodes.

FIG. 9 is a schematic diagram of a circuit block of an electronic device of another embodiment. FIG. 10 and FIG.

Figure 11:
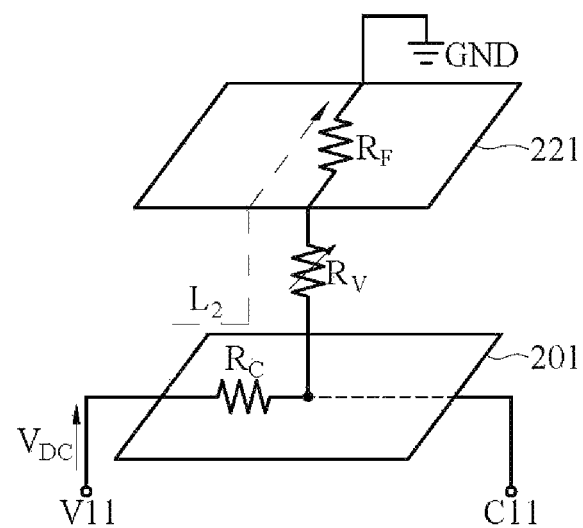
FIG. 11 is a schematic diagram of an equivalent circuit model of FIG. 10.
Figure 12:
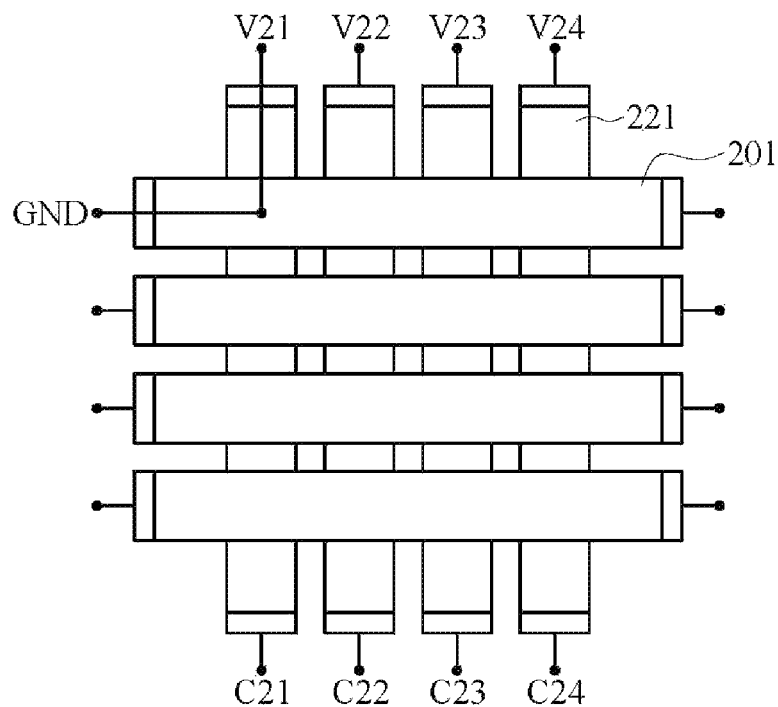
FIG. 12 is a schematic diagram of a second driving structure of common electrodes and pressure sensing electrodes.
Figure 13:
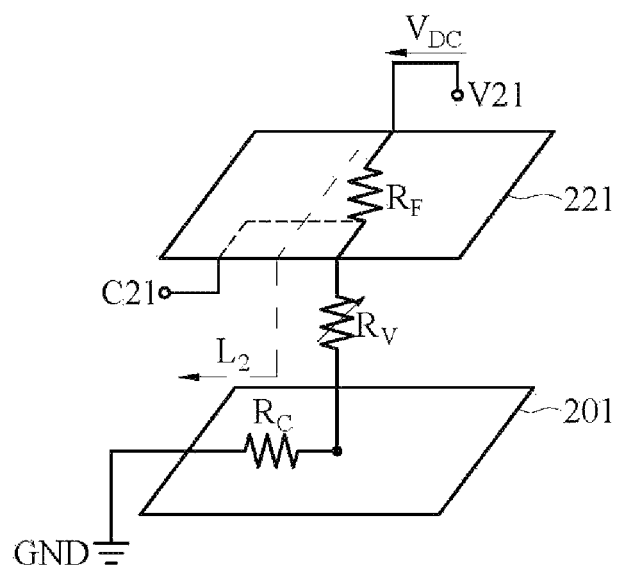
FIG. 13 is a schematic diagram of an equivalent circuit model of FIG. 12.

11 are a schematic diagram of a first driving structure and its equivalent circuit model of common electrodes 201 and pressure sensing electrodes 221. FIG. 12 and FIG. 13 are a schematic diagram of a second driving structure and its equivalent circuit model of common electrodes 201 and pressure sensing electrodes 221. Please refer to FIG. 1, FIG. 3, and FIG. 9 to FIG. 13 together, an electronic device 38 includes a processor 40 and a force touch assembly 10 electrically connected to the processor 40. In the processor 40, the drive scanning circuit 42 is electrically connected to the common electrodes 201 through a plurality of drive scanning lines 50 to sequentially generate the scanning signal to the corresponding common electrodes 201. The capacitive touch sensing circuit 44 is electrically connected to the capacitive sensing electrodes 161 by a plurality of capacitive sensing lines 52. The resistor voltage sensing circuit 46 is electrically connected to the common electrodes 201 and the pressure sensing electrodes 221 by a plurality of the pressure-sensitive measuring lines 54 and a plurality of the pressure-sensitive driving lines 56. The resistor voltage sensing circuit 46 receives first voltage division values and second voltage division values from the common electrodes 201 and the pressure sensing electrodes 221 through the pressure-sensitive measuring lines 54 and the pressure-sensitive driving lines 56. Each of the capacitive sensing electrodes 161 and each of the corresponding common electrodes 201, which are corresponding to each other, form a capacitive touch sensing loop $L_1$ together, to detect the touch sensing signal $S_C$. Then, each of the capacitive sensing electrodes 161 transmits the touch sensing signal $S_C$ to the processor 40 through the capacitive sensing lines 52, and then the processor 40 determines the location of the touch behavior according to the touch sensing signals $S_C$ generated by the capacitive sensing electrodes 161. Each of the common electrodes 201, each of the variable pressure sensitive materials 24, and each of the pressure sensing electrodes 221, which are corresponding to each other, form a varistor sensing loop $L_2$ together, to detect the first voltage division values and the second voltage division values. Then, each of the common electrodes 201 transmits the first voltage division values to the processor 40, and each of the pressure sensing electrodes 221 transmits the second voltage division values to the processor 40. The processor 40 determines the pressure level of the touch behavior according to the first voltage division values and the second voltage division values.

In detail, the capacitive touch sensing circuit 44 receives the touch sensing signals generated by each of the capacitive sensing electrodes 161. Regarding the operation of the capacitive touch sensing loop $L_1$, the detailed description is the same as the previous embodiment, so it will not be repeated here. when each of the capacitive touch sensing loop $L_1$ detects the touch sensing signal, in the varistor sensing loop $L_2$, the drive scanning circuit 42 sequentially supplies a DC voltage to first ends V11 to V14 of each of the common electrodes 201, the resistor voltage sensing circuit 46 sequentially connects the pressure sensing electrodes 221 to ground GND, and the second electrodes C11 to C14 of the common electrodes 201 sequentially receive the first voltage division values and transmit the first voltage division values to the resistor voltage sensing circuit 46. Then, the resistor voltage sensing circuit 46 sequentially supplies a DC voltage to the first ends V21 to V24 of each of the pressure sensing electrodes 221, the drive scanning circuit 42 sequentially connects the common electrodes 201 to ground GND, and the second ends C21 to C24 of the pressure sensing electrodes 221 receive the second voltage division values and transmit the second voltage division values to the resistor voltage sensing circuit 46.

The processing circuit 48 is electrically connected to the drive scanning circuit 42, the capacitive touch sensing circuit 44 and the resistor voltage sensing circuit 46. The capacitive touch sensing circuit 44 converts the touch sensing signals into the coordinate information signals and transmits the coordinate information signals to the processing circuit 48. Then, the processing circuit 48 determines the location of the touch behavior according to the change of the coordinate information signals. the resistor voltage sensing circuit 46 converts the first voltage division values and the second voltage division values into the pressure information signals and transmits the pressure information signals to the processing circuit 48. Then the processing circuit 48 determines the pressure level of the touch behavior according to the pressure information signals.

In an embodiment, the common electrode 201 has a second parasitic resistance $R_C$, the variable pressure sensitive material 24 has the variable resistance $R_V$, and the pressure sensing electrode 221 has a third parasitic resistance $R_F$. The second parasitic resistance $R_C$, the variable resistance $R_V$, and the third parasitic resistance $R_F$ form the varistor sensing loop $L_2$. In detail, a DC voltage VDC is applied to the first end V11 of the common electrode 201, and the pressure sensing electrode 221 are connected to ground GND (as shown in FIG. 11). At this time, the second end C11 of the common electrode 201 collects the first voltage division values $V_{C11}$ information, and the voltage division equation is $$V_{C11} = V_{DC} \times \left( \frac{R_V + R_F}{R_C + R_V + R_F} \right),$$

wherein the resistance value of the variable resistance $R_V$ varies with the pressure level. Each of the common electrodes 201 is sequentially applied with a DC voltage $V_{DC}$ and outputs the first voltage division values until all the common electrodes 201 output the first voltage division values. The first voltage division values (including $V_{C11}$) are transmitted to the resistor voltage sensing circuit 46 for signal processing. When all the common electrodes 201 output the first voltage division values, the pressure sensing electrodes 221 are driven. Apply the DC voltage $V_{DC}$ to the first end V21 of each of the pressure sensing electrode 221, the corresponding common electrode 201 is connected to grounded GND (as shown in FIG. 13). At this time, the second end C21 of each of the pressure sensing electrodes 221 collects the second voltage division values $V_{C21}$, and the voltage division equation is $$V_{C21} = V_{DC} \times \left( \frac{R_C + R_V}{R_C + R_V + R_F} \right),$$

wherein the resistance value of the variable resistance $R_V$ varies with the pressure level. Each of the pressure sensing electrodes 221 is sequentially applied with a DC voltage $V_{DC}$ and outputs the second voltage division values until all the pressure sensing electrodes 221 output the second voltage division values. The second voltage division values (including $V_{C21}$) are transmitted to the resistor voltage sensing circuit 46 for signal processing.

The pressure information signals are generated and transmitted to the processing circuit 48 after the resistor voltage sensing circuit 46 individually processes the first voltage division values and the second voltage division values. Then, the processing circuit 48 determines the pressure level of the touch behavior according to the change of the pressure information signals.

The force touch assembly provided in the disclosure includes a two-dimensional capacitive structure at the top and an inductive resistance structure at the bottom, utilize the capacitive sensing electrodes, the common electrodes, the pressure sensing electrodes to detect a touch behavior and the corresponding signal. Therefore, the force touch assembly has the two-dimensional coordinate recognition function and three-dimensional spatial information acquisition function (depth pressure sensing function) to provide more diversified applications. Furthermore, the structural design of the force touch assembly avoid the assembly misalignment problem.

Although the present invention has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. A force touch assembly, comprising a first substrate, a second substrate, a first patterned conductive layer, an insulation layer, a second patterned conductive layer, a plurality of variable pressure sensitive materials and a third patterned conductive layer, wherein the first patterned conductive layer, the insulation layer, the second patterned conductive layer, the plurality of variable pressure sensitive materials and the third patterned conductive layer are sequentially stacked from top to bottom between the first substrate and the second substrate;

wherein the first patterned conductive layer includes a plurality of capacitive sensing electrodes, the second patterned conductive layer includes a plurality of common electrodes, the third patterned conductive layer includes a plurality of pressure sensing electrodes, the vertical projection of the common electrodes on the second substrate is interleaved with the vertical projection of the capacitive sensing electrodes on the second substrate, and the vertical projection of the pressure sensing electrodes on the second substrate is interleaved with the vertical projection of the common electrodes on the second substrate; and wherein when a DC voltage is provided to a first end of each of the common electrodes sequentially, and each of the pressure sensing electrodes is grounded, each of the common electrodes, each of the variable pressure sensitive materials and each of the pressure sensing electrodes, which are corresponding to each other, form a varistor sensing loop together, and a second end of each of the common electrodes receives first voltage division values; and when the DC voltage is provided to the first end of each of the pressure sensing electrodes, each of the common electrodes is grounded, and the second end of each of the pressure sensing electrodes receive second voltage division values.

2. An electronic device, comprising:

a force touch assembly, including a first substrate, a second substrate, a first patterned conductive layer, an insulation layer, a second patterned conductive layer, a plurality of variable pressure sensitive materials and a third patterned conductive layer, wherein the first patterned conductive layer, the insulation layer, the second patterned conductive layer, the plurality of variable pressure sensitive materials and the third patterned conductive layer are sequentially stacked from top to bottom between the first substrate and the second substrate, the first patterned conductive layer includes a plurality of capacitive sensing electrodes, the second patterned conductive layer includes a plurality of common electrodes, the vertical projection of the common electrodes on the second substrate is interleaved with the vertical projection of the capacitive sensing electrodes on the second substrate, and the third patterned conductive layer includes a plurality of pressure sensing electrodes, the vertical projection of the pressure sensing electrodes on the second substrate is interleaved with the vertical projection of the common electrodes on the second substrate; and a processor, electrically connected to the force touch assembly, wherein, each of the capacitive sensing electrodes separately transmits a touch sensing signal to the processor, each of the common electrodes separately transmits a first voltage division value to the processor, and each of the pressure sensing electrodes separately transmits a second voltage division value to the processor, the processor determines the location of a touch behavior according to the touch sensing signal transmitted by each of the capacitive sensing electrodes, and the processor determines the pressure level of the touch behavior according to the first voltage division value transmitted by each of the common electrodes and the second voltage division value transmitted by each of the pressure sensing electrodes.

3. The electronic device according to claim 2, wherein the processor comprises:

a drive scanning circuit, electrically connected to the common electrodes, to sequentially generate a scanning signal to the common electrodes correspondingly;

a capacitive touch sensing circuit, electrically connected to the capacitive sensing electrodes, each of the capacitive sensing electrodes and corresponding one of the common electrodes form a capacitive touch sensing loop, for detecting a touch sensing signal, the capacitive touch sensing circuit receives the touch sensing signal from each of the capacitive sensing electrodes; and a resistor voltage sensing circuit, electrically connected to the pressure sensing electrodes, wherein each of the common electrodes, each of the variable pressure sensitive materials, each of the pressure sensing electrodes, and the resistor, which are corresponding to each other, form a varistor sensing loop together, wherein, after each of the capacitive touch sensing loop detects the touch sensing signal, the drive scanning circuit sequentially provides a DC voltage to a first end of each of the common electrodes, the resistor voltage sensing circuit grounds each of the pressure sensing electrodes, a second end of each of the common electrodes receives the first voltage division value, the resistor voltage sensing circuit sequentially provides the DC voltage to the first end of each of the pressure sensing electrodes, the drive scanning circuit grounds each of the common electrodes, the second end of each of the pressure sensing electrodes receives the second voltage division value, and the resistor voltage sensing circuit receives the first voltage division value from the second end of each of the common electrodes and receives the second voltage division values from the second end of each of the pressure sensing electrodes; and a processing circuit, electrically connected to the drive scanning circuit, the capacitive touch sensing circuit, and the resistor voltage sensing circuit.

4. The electronic device according to claim 3, wherein the capacitive touch sensing circuit separately converts the touch sensing signal to a coordinate information signal, and transmits the coordinate information signal to the processing circuit, the processing circuit determines the location of the touch behavior according to the coordinate information signal.

5. The electronic device according to claim 4, wherein the resistor voltage sensing circuit individually processes the first voltage division value and the second voltage division value, which are corresponding to each other, to generate a pressure information signal, and transmits the pressure information signal to the processing circuit, the processing circuit determines the pressure level of the touch behavior according to the pressure information signal.

6. The electronic device according to claim 3, wherein at least two of the driving circuit, the capacitive touch sensing circuit, the resistor voltage sensing circuit, and the processing circuit are integrated in one integrated circuit.

7. The electronic device according to claim 3, wherein the drive scanning circuit connects with the common electrodes through a plurality of drive scanning lines; the capacitive touch sensing circuit connects with the capacitive sensing electrodes through a plurality of capacitive sensing lines; and the resistor voltage sensing circuit connects with the pressure sensing electrodes and the common electrodes through a plurality of pressure-sensitive measuring lines and a plurality of pressure-sensitive driving lines.

8. The electronic device according to claim 2, wherein the force touch assembly further comprises a plurality of spacers, located between the second patterned conductive layer and the second substrate and between the variable pressure sensitive materials.

* * * * *